United States Patent [19]

Voillot

[11] 4,448,299
[45] May 15, 1984

[54] APPARATUS FOR ADVANCING ELONGATE OBJECTS AROUND A CURVE

[75] Inventor: Hervé Voillot, Sartrouville, France

[73] Assignee: Creusot-Loire, Paris, France

[21] Appl. No.: 311,730

[22] Filed: Oct. 15, 1981

[30] Foreign Application Priority Data

Dec. 1, 1980 [FR] France .................. 80 25442

[51] Int. Cl.³ .................................... B65G 47/26
[52] U.S. Cl. ............................ 198/457; 198/723;
89/33 BA
[58] Field of Search ................ 198/457, 475, 723;
89/33 BA

[56] References Cited

U.S. PATENT DOCUMENTS

| 2,109,148 | 2/1938 | Gwinn | 198/457 |
| 2,344,975 | 3/1944 | De Back | 198/475 |
| 2,370,969 | 3/1945 | Kantor | 198/475 |
| 3,881,395 | 5/1975 | Cozzi et al. | 198/475 |

FOREIGN PATENT DOCUMENTS 123247 11/1948 Sweden .................. 89/33 BA

Primary Examiner—Joseph E. Valenza
Assistant Examiner—Jonathan D. Holmes
Attorney, Agent, or Firm—Pollock, Vande Sande & Priddy

[57] ABSTRACT

Apparatus for advancing elongate objects (D) around a curve between upstream and downstream straight guideways (1, 3) connected by a curved connecting guideway (2), each guideway being constituted by two pairs of parallel guides (11, 12; 31, 32) between which the objects (D) are advanced in successive displacements by means of two series (13, 14; 33, 34) of seating plates. The inner guides (22) of the curved guideway (2) are associated with seating plates (24) angularly spaced and driven in synchronism with the plates (14, 34) of the straight guideways (1, 3) and outer guides (21) are associated, in the central part (A) of the curve, with a series (23) of overlapping seating plates the axes of which are normal to the curve, angularly spaced and rotated in synchronism at a speed determining along the outer guide (21) a tangential speed corresponding to the constant angular rate of change of orientation, and, in the upstrem (B1) and downstream (B2) parts of the curve, with two varying-speed drive devices (4, 5). The invention is especially applicable to the advancing of ammunition in an artillery turret.

3 Claims, 4 Drawing Figures

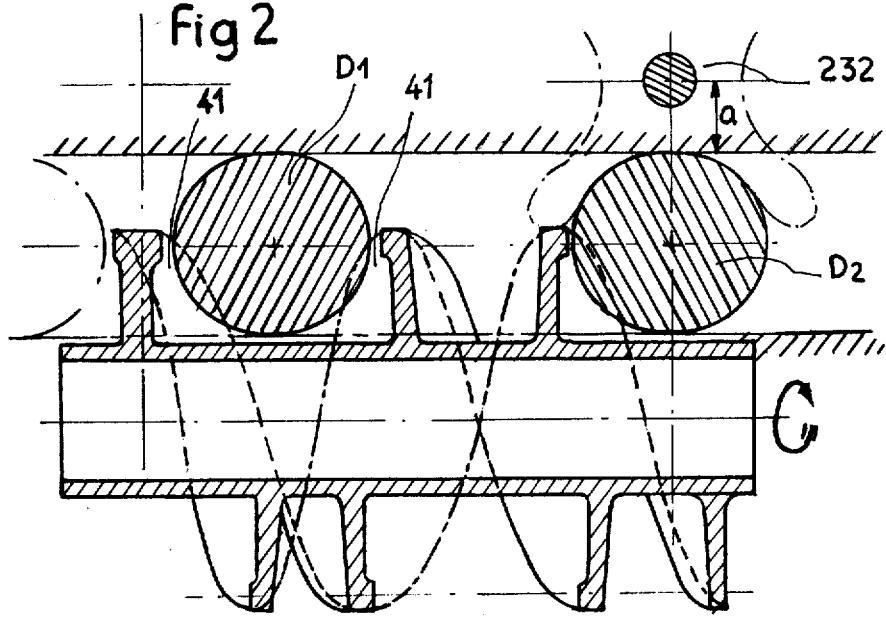
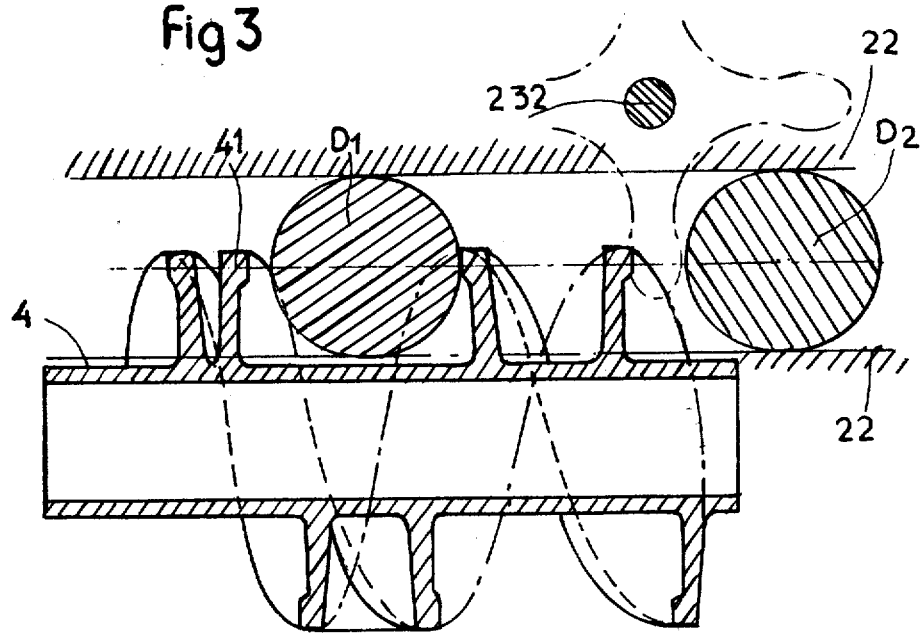

APPARATUS FOR ADVANCING ELONGATE OBJECTS AROUND A CURVE

FIELD OF THE INVENTION

The subject of the invention is an apparatus for advancing elongate objects around a curve between two straight guideways, and is especially applicable to the advancing of ammunition for loading a gun.

BACKGROUND

In artillery turrets ammunition is advanced from the magazine to the barrel via a series of straight or curved guideways. Each straight guideway is bounded by two pairs of parallel guides, the guides of each pair being separated by a distance substantially equalling the width of the piece of ammunition.

The piece of ammunition is thus always guided at two points, i.e., near the cartridge flange and near the crimping.

The two guides are respectively associated with two series of overlapping seating plates fixed on shafts perpendicular to the guides and rotated in synchronism at a rate determining a constant linear rate of displacement of the piece of ammunition inside the guideway. To this end, each plate generally has several seats, four, for example, which thus give it the shape of a Maltese cross. During rotation of the plate, the piece of ammunition is therefore taken into the seat, which moves it forward and pushes it toard the next plate. The arms of the Maltese cross are obviously profiled so as to take up the ammunition and expel it without any jolting.

At the exit of the magazine, the pieces of ammunition move one after the other in a vertical direction and are introduced into a fixed guideway in which they move parallel to each other. It is advantageous to return them to the horizontal, and for this reason the fixed guideway is constituted by two straight guideways, one horizontal and the other vertical, connected by a circular guideway in which the orientation of the piece of ammunition progressively changes.

Like the straight guideway, the circular guideway is bounded by two pairs of guides assuring continuity with the upstream guideway and the downstream guideway respectively of the inner side and the outer side of the curve. The shape of the piece of ammunition is of course allowed for to ease its passage around the curve, and for this reason the inner side is normally the one for the crimping and the outer side is the one for the cartridge flange.

It, as indicated, the upstream and downstream straight guideways are provided with overlapping seating plates driven in synchronism, the same apparatuses can clearly not be used in the same way to obtain displacement inside the curved guideway, the piece of ammunition no longer moving parallel to itself but about the center of the curved guideway instead, this being generally circular.

SUMMARY OF THE INVENTION

The subject of the invention is an apparatus allowing progressive advance without any jolting of the piece of ammunition inside the curved guideway in phase with the upstream guideway and the downstream guideway.

In conformance with the invention, the inner guides of the curved guideway are associated with a series of seating plates fixed on shafts normal to the curve and angularly spaced, the said plates being driven in synchronism with the plates of the straight guideways at a rate determining a constant angular rate of change of orientation of the ammunition. The outer guides are associated, in the central part of the curve, with a series of overlapping seating plates whose axes are normal to the curve and angularly spaced, the said plates being rotated in synchronism at a rate determining a tangential speed, along the outer guide, corresponding to the constant angular rate of change of orientation, and are associated in the upstream and downstream parts of the curve with two varying-speed drive devices determining along the outer guide, respectively, in the upper part, a tangential speed increasing from the linear speed of the upstream guideway to the tangential speed of the curved guideway, and in the dowonstream part, a tangential speed decreasing from the tangential speed of the curved guideway to the linear speed of the downstream guideway.

In a preferred embodiment, each of the varying speed drive devices is constituted by a screw comprising a helical screw thread with pitch varying from a width greater than that of the objects, the screw being oriented and positioned at such a level that the plane passing through an inner guide and an outer guide of the curve is tangential to the bottom of the screw thread and that the median plane of the screw thread is normal to the guide at the tangent point.

The pitch of the screw thread of the upstream screw varies so as to determine, as a function of the variation of the radius of the curve along the screw, at the upstream end, a rate of displacement which increases from the linear speed in the upstream guideway to a speed greater than tangential speed corresponding to the constant angular speed, and at the downstream end, a speed decreasing to the tangential speed in the curved guideway. The pitch of the downstream screw thread varies in the reverse direction from the tangential speed in the curved guideway to the linear speed in the downstream guideway.

The invention will not be described, with reference to a particular embodiment, given by way of example and represented in the attached drawings.

BRIEF DESCRIPTION OF THE DRAWINGS

FIG. 2 and FIG. 3 are detailed views on an enlarged scale of a screw for displacement at varying speed in two successive positions.

DETAILED DESCRIPTION

Figure 1:
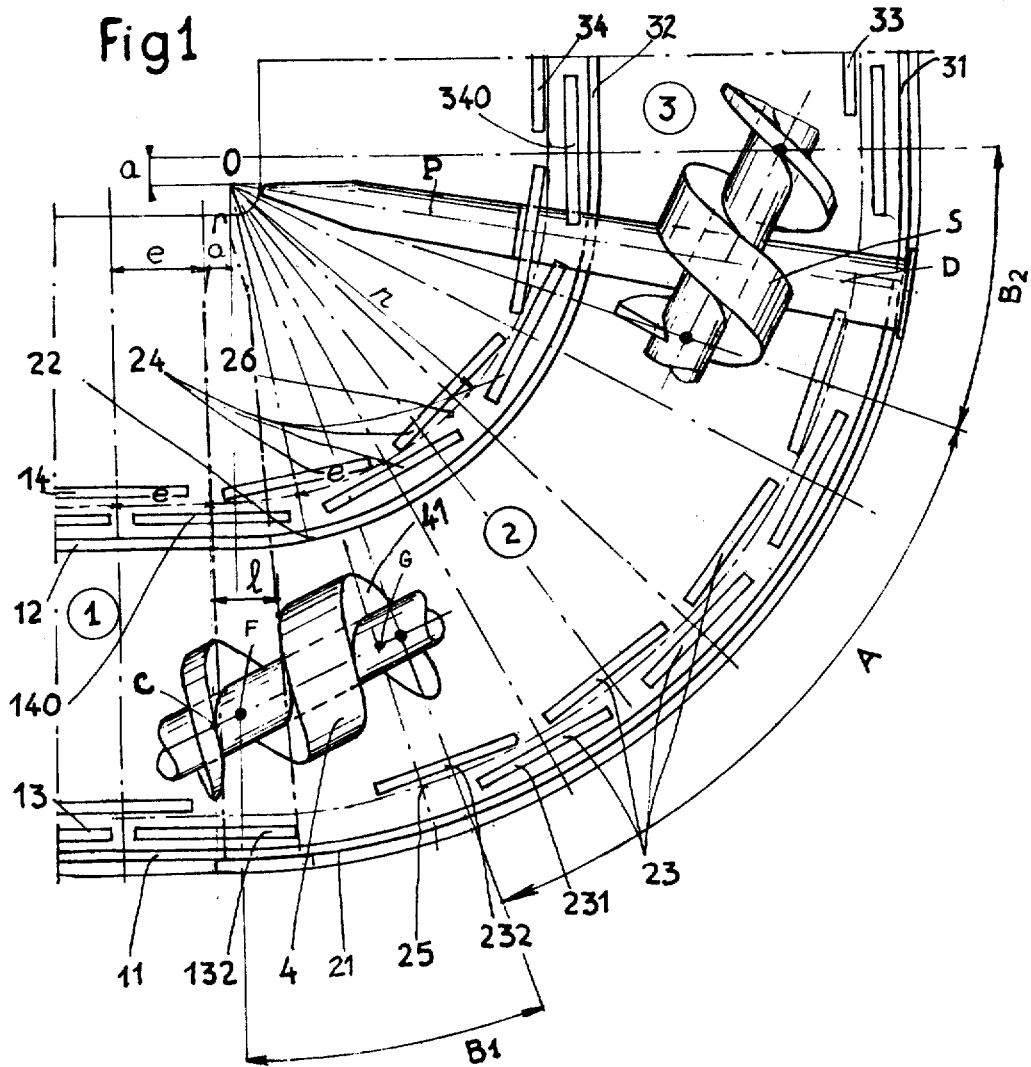
FIG. 1 is a diagrammatic view in elevation of the apparatus for advance around a curve according to the invention.

FIG. 1 shows diagrammatically an upstream straight guideway 1 connected by a curved guideway 2 to a downstream straight guideway 3.

The pieces of ammunition are brought from the magazine through an access shaft (not shown) in which they move vertically, one behind the other, and are introduced one beside the other into the upstream guideway 1 inside which they move parallel to each other. To this end, they are guided by two pairs of parallel guides 11 and 12 respectively positioned at the cartridge flange and at the crimping, the cartridge being normally at the lower part and the projectile at the upper part.

Displacement of the pieces of ammunition parallel to each other is determined by two series 13, 14 of seating plates respectively associated with the guides 11 and 12.

As these are conventional arrangements, they have only been represented schematically in FIG. 1.

Similarly, the downstream guideway 3, inside which the pieces of ammunition move parallel to their horizontal axis, is essentially constituted by two pairs of guides 31, 32 associated with two series of plates 33, 34.

In the straight guideways 1 and 3, the two series of plates are driven in synchronism so as to cause displacement of the pieces of ammunition parallel to each other and at the same linear speed proportional to the rate of rotation of the plates.

When the seating plates have four seats, as is usual, they turn three-quarters of a turn per cycle.

The curved guideway 2 which assures connection between the straight guideways 1 and 3 is bounded by two pairs of curved guides 21, 22 connecting tangentially with the rectilinear guides, respectively 11 and 12 of the upstream side and 31, 32 of the downstream side.

The curved guideway 2 is normally circular in shape, the guides 21, 22 being centered at a point O located near the end of the projectile P. In practice, the profiled shape of the shell facilitates rotation about this point.

In the upstream and downstream guideways, the ammunition moves linearly by a distance e at each third of a cycle. According to a characteristic of the invention, the inner guides 22 are associated with a series of seating plates 24 which are regularly spaced angularly so that their axes pass through the point O and are consequently normal to the guide 22 and the centers of the plates are also spaced angularly by an arc of circle substantially equal in length to e. In addition, the center O of the curved guideway 1 is preferably positioned at a distance a from the axes of the last plate 140 of the upstream guideway and from the first plate 340 of the downstream guideway, the distance a corresponding to the position in which the piece of ammunition disengages from the plates 140 and 132. The upstream and downstream guideways 1 and 3 are thus extended by the distance a beyond the axis of their end plates.

The inner plates 24 of the curved guideway are driven in synchronism with the plates 14 and 34 of the straight guideways, and it can be seen that the piece of ammunition can be progressively advanced without any jolting from the guideway 1 and the guideway 3, at least from the inner side, i.e., the crimping side, by means of the described structure.

The same arrangement cannot, of course, be adopted at the outer guides 21 since the piece of ammunition has to cover a greater distance in the same time.

According to a second characteristic of the invention, the curved guideway is therefore divided into three parts.

In the central part A, the change in orientation of the piece of ammunition is assured with a constant angular speed, which is determined by the plates 24 turning in synchronism with the plates 14 and 34, i.e., by ¾ of a turn per cycle.

Displacement of the piece of ammunition at the cartridge side is therefore assured by a series of seating plates 23 which must be rotated at a rate assuring the tangential speed corresponding to the constant regular speed required and which consequently depends on the radius of the curve at the level of the plates.

Like the plates 24 associated with the inner guides 22, the plates 23 are angularly spaced so that their axes pass through the center O of the curve and so that they are consequently normal to the guides 21.

The plates are preferably arranged on either side of a mean line 25 with a radius double the mean line 26 of the plates 24. The tangential speed along the plates will thus be double the tangential speed along the line 26 which is itself equal to the linear rate of displacement in the guideways 1 and 3. The plates 23 can have a shape which is identical with that of the plates 24 and are double the number of plates 24 corresponding to the same angular sector. The series of outer plates 23 thus includes, on the one hand, the plates 231 coaxial with the inner plates 24 and on the other the plates 232 whose axes are directed along the bisectors of the angles formed by the axes of the plates 24.

As the length of the mean arc 25 is double that of the arc 26, the plates 23 are rotated in synchronism so as to turn through 1.5 of a turn per cycle to determine the required angular speed.

A progressive change in orientation without any jolting of the piece of ammunition in the central part A of the curve is assured by means of the arrangement just described.

In the end parts B1 and B2 of the curve, however, on either side of central part A, it will be necessary to assure displacement of the piece of ammunition at the cartridge side at the speed which increases in the part B1 and decreases in the part B2.

In practice, in the part B1, the end of the cartridge side which was driven by the plates 13 at a constant linear speed, causing it to cover the distance e in each third of a cycle, will travel at twice the tangential speed caused by the plates 25. Similarly, in the part B2, the tangential speed of the piece of ammunition at the cartridge side must decrease progressively to the linear half speed determined by the plates 33 of the guideway 3.

The connection between the plates 13 of the upstream guideway and the plates 23 of central part A must therefore be assured by a device which allows the cartridge end of the piece of ammunition to be progressively accelerated, and inversely to be decelerated between the part A and the downstream guideway 3.

Various devices of a greater or lesser complexity can be envisaged for taking up the piece of ammunition in the parts B1 and B2 and giving it a uniformly accelerated or decelerated movement. In an apparatus of this type, however, purely mechanical members are advantageously used and, according to a preferred characteristic of the invention, screws 4 and 5 with varying pitch, represented diagrammatically in FIG. 1, are used.

Use of a varying pitch allows the required acceleration to be assured in a very simple way. It is also possible, as represented, to give each screw a screw thread with a width (1) which is slightly greater than the width of the cartridges D and to orient the screw so that the bottom of the screw thread is substantially tangential to the plane passing through the two guides 11 and 12 along which the ammunition moves, and so that, at the tangent point, the median plane of the screw thread passes substantially through the center O of the curve.

FIG. 1 shows that this condition can be achieved if the screws 4 and 5 are so oriented that their axes are inclined with respect to the axes of the guideways 1 and 3 and substantially perpendicular to the axes of the plates of the series 24 positioned at the ends of the sector A.

The upstream screw 4 has been represented on an enlarged scale in FIGS. 2 and 3 which are longitudinal cations along the axis of the screw and in which the first plate 232 of the series 23 has been represented in chain-dotted lines.

The pitch of the screw is so calculated that displacement of the piece of ammunition is in phase at entry and exit of the screw with the adjacent plates, and accelerations and decelerations of the movement have acceptable final values. In view of the inclination which the thread must be given to obtain the required orientation, this result can be obtained if the screw is driven, for example, at a rate of rotation of three turns per cycle. FIGS. 2 and 3 show, for example, two successive positions of the screw and the plate 232 after a quarter turn rotation of the screw which corresponds to a rotation of ⅛ of a turn of the plate 232 and 1/16 of a turn of the last plate 132 of the series 13.

In the position of FIG. 2, the piece of ammunition D1 from the upstream guideway leaves the plate 132 and is taken up by the screw thread 41 of the screw. Conversely, for the same position, the plate 232 takes up the piece of ammunition D2 which arrives at the end of the screw.

In the position of FIG. 3, only the piece of ammunition D1 is pushed by the screw thread 41 of the screw 4 when the piece of ammunition D2 has left the screw and is pushed along the guides 22 by the plate 232.

Figure 4:
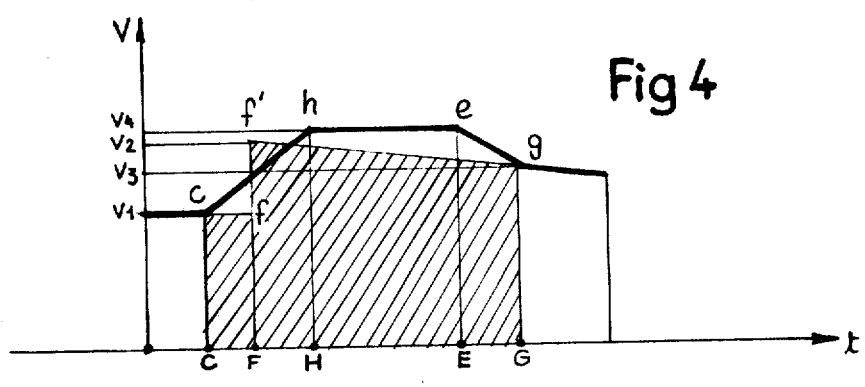
FIG. 4 is a diagram of speeds along the axis of the screw.

FIG. 4 represents the diagram of linear speeds along the axis of the screw, time being indicated as abscissae and speed as ordinates.

The take-up by the screw 4 begins substantially at the level of the axis of the last plate 132 of the guideway 1. However, as indicated, the guideway is extended beyond this axis by a distance a. The rate of displacement of the piece of ammunition (equal to the linear speed $V_1$ in the guideway 1) must therefore change sharply at this spot, which corresponds to the point F of the screw, to the tangential speed $V_2$ which corresponds, as a function of the radius OF of the curve, to the constant angular speed which itself corresponds along the inner line 26 to the speed $V_1$. Therefore $V_2 = V_1 \cdot OF/r$, r being the radius of the mean line 26 of the series of plates 24.

At the point G of the screw from which the piece of ammunition is taken up by the first plate 232 of the series 23, the linear rate of displacement must be $V_3 = V_1 \cdot OG/r$.

To avoid a sharp change of speed from $V_1$ to $V_2$, the screw is caused to take up the piece of ammunition from a point C located upstream of F. The pitch of the screw is determined so that the speed increases progressively to a value $V_4$ which is maintained in the central part of the screw, between the points H and E, the linear speed decreasing progressively from $V_4$ to $V_3$ between the points E and G.

For displacement of the screw at constant angular speed, i.e., for the rear part of the piece of ammunition to move through the arc $B_1$, the area of the polygon C, c, h, e, g, G must be equal to the area of the polygon C, c, f, f', g, G. To achieve this, the point C must be located upstream of the point F and the speed $V_4$ must be greater than $V_2$.

The length of the horizontal segment DE corresponding to displacement at constant speed $V_4$ can vary, of course.

A means of calculating the pitch for the screw, which takes, the orientation given its axis into account, is thus provided.

The screw 5 effects in the reverse manner the changeover from the tangential speed to the linear speed in the downstream guideway 3, and therefore has a profile symmetrical with that of the screw 4. In addition, as represented in FIG. 1, the screws 4 and 5 can be positioned at either side of the median plane of the guideway, like the seating plates, since their only function is to make the pieces of ammunition slide along the guideway.

The arrangement of the screws and the way they are driven will generally depend on the possible bulk of the various mechanical members required to be used.

It is also obvious that, if the use of screws with varying pitch is advantageous, other devices controlled by cams, for example, can be used for changing over from the straight guideway to the central part of the curved guideway and the reverse.

I claim:

1. Apparatus for advancing elongate objects (D) around a curve between an upstream straight guideway (1) and a downstream guideway (3) of different orientation, connected by curved connecting guideway (2), each of said straight guideways (1, 3) being constituted by two pairs of parallel guides (11, 12; 31, 32) between which said objects (D) are advanced by successive displacements by means of two series (13, 14; 33, 34) of overlapping seating plates fixed on shafts perpendicular to said guides and rotated in synchronism at a rate determining a constant linear rate of displacement of said objects, said curved connecting guideway (2) being bounded by two pairs of guides (21, 22) assuring continuity of guidance from said upstream guideway (1) to said downstream guideway (3) respectively at the inner side and the outer side at the curve therebetween, said inner guides (22) of said curved guideway (2) being associated with a series of angularly spaced seating plates (24) fixed on shafts normal to said curve, said plates (24) being driven in synchronism with said plates (14; 34) of said straight guideways (1, 3) at a rate determining a constant angular rate of change of orientation of said objects; said outer guides (21) being associated in the central part (A) of said curve, with a series of angularly spaced, overlapping seating plates (23) the axes of which are normal to said curve, said seating plates (23) being rotated in synchronism at a rate determining, along the outer guide (21), a tangential speed corresponding to the constant angular rate of change of orientation, and said outer guides (21) being associated, in the upstream (B1) and downstream (B2) parts of said curve, with two varying-speed drive devices (4, 5) determining along said outer guide 21 respectively in the upstream part (B1) a tangential speed increasing from the linear speed along said upstream guideway (1) to the tangential speed along said curved guideway (3) and in said downstream part (B2) a tangential speed decreasing from the tangential speed along said curved guideway (2) to the linear speed along said downstream guideway (3).

2. Advancing apparatus according to claim 1, wherein each of said varying-speed drive devices comprises a screw (4, 5) including a helical screw thread (41) with varying pitch of slightly greater width than that of said objects, said screw being oriented and positioned at such a level that the plane passing through a said inner guide and a said outer guide (21) of said curved guideway (2) is substantially tangential to the bottom of said screw thread (41) and that, at the tangent point, the median plane of said screw thread is normal to said guides (21, 41).

3. Advancing apparatus according to claim 2, wherein the pitch of said screw thread (41) of said upstream screw (4) varies so as to determine, as a function of the variation of the radius of said curve along the screw at the upstream end, a rate of displacement increasing from the linear speed V1 in said upstream guideway (1) to a speed V4 greater than the tangential speed V2 corresponding to the constant angular speed and, at the downstream end, a speed decreasing to the tangential speed V3 in said curved guideway (3), and the pitch of said screw thread of said downstream screw (5) varies in the reverse direction for the tangential speed in said curved guideway to the linear speed in said downstream guideway (3).

* * * * *